United States Patent
Rabaut et al.

(10) Patent No.: US 12,460,367 B2
(45) Date of Patent: Nov. 4, 2025

(54) METHOD FOR ANCHORING A HOLLOW TUBULAR ELEMENT IN A WATER BOTTOM, AND ASSEMBLY OF THE TUBULAR ELEMENT AND A CLOSING BODY

(71) Applicant: DEME Offshore BE NV, Zwijndrecht (BE)

(72) Inventors: Dieter Wim Jan Rabaut, Ghent (BE); Roeland Magda Dirk De Rycker, Wilrijk (BE)

(73) Assignee: DEME Offshore BE NV, Zwijndrecht (BE)

( * ) Notice: Subject to any disclaimer, the term of this patent is extended or adjusted under 35 U.S.C. 154(b) by 169 days.

(21) Appl. No.: 18/100,923

(22) Filed: Jan. 24, 2023

(65) Prior Publication Data

US 2023/0392339 A1 Dec. 7, 2023

(30) Foreign Application Priority Data

Jun. 3, 2022 (BE) .................... 2022/5434

(51) Int. Cl.
*E02D 7/00* (2006.01)
*E02D 5/24* (2006.01)
(Continued)

(52) U.S. Cl.
CPC .................. *E02D 7/20* (2013.01); *E02D 5/24* (2013.01); *E02D 7/10* (2013.01); *E02D 7/18* (2013.01);
(Continued)

(58) Field of Classification Search
CPC .... E02D 7/20; E02D 7/10; E02D 7/18; E02D 5/24; E02D 2250/0053; E02D 2200/1685; E02D 7/28
See application file for complete search history.

(56) References Cited

U.S. PATENT DOCUMENTS

| | | | | |
|---|---|---|---|---|
| 4,012,147 A | * | 3/1977 | Walrafen | ............. G01J 3/0221 356/73.1 |
| 4,432,671 A | | 2/1984 | Westra et al. | |

(Continued)

FOREIGN PATENT DOCUMENTS

| | | |
|---|---|---|
| CN | 112252309 A | 1/2021 |
| EP | 0011894 A1 | 6/1980 |
| EP | 3517479 A1 | 7/2019 |

*Primary Examiner* — Carib A Oquendo
(74) *Attorney, Agent, or Firm* — The Webb Law Firm

(57) ABSTRACT

Described is a method for anchoring a hollow tubular element in a water bottom. An upper outer end of the tubular element is first closed substantially airtightly by a closing body. The tubular element with closing body is taken up from a vessel with a lifting means and lowered into the water in a substantially vertical position. Air in the tubular element with closing body is here compressed and the pressure in the tubular element with closing body increases. The weight of the tubular element with closing body suspended from the lifting means is then adjusted by allowing the air to escape at least partially and/or suctioning the air away at least partially to below atmospheric pressure. The pressure in the tubular element with closing body decreases and the tubular element with closing body penetrates into the water bottom under the weight. Finally, the closing body is removed and the tubular element is optionally driven further into the water bottom with a pile-driving means.

17 Claims, 9 Drawing Sheets

(51) Int. Cl.
   *E02D 7/10*  (2006.01)
   *E02D 7/18*  (2006.01)
   *E02D 7/20*  (2006.01)

(52) U.S. Cl.
   CPC ............... *E02D 2200/1685* (2013.01); *E02D 2250/0053* (2013.01); *E02D 2600/30* (2013.01)

(56) References Cited

U.S. PATENT DOCUMENTS

| | | | |
|---|---|---|---|
| 4,575,282 | A | 3/1986 | Pardue, Sr. et al. |
| 5,704,732 | A * | 1/1998 | Horton, III ............. B63B 21/26 114/296 |
| 7,527,455 | B2 * | 5/2009 | Raines .................... B63B 21/29 405/224.1 |
| 11,008,726 | B2 * | 5/2021 | Vehmeijer ................ F16L 1/207 |
| 2017/0275845 | A1 * | 9/2017 | Belder ....................... E02D 7/06 |
| 2020/0071899 | A1 * | 3/2020 | Dingman ............ F16L 55/1125 |

* cited by examiner

METHOD FOR ANCHORING A HOLLOW TUBULAR ELEMENT IN A WATER BOTTOM, AND ASSEMBLY OF THE TUBULAR ELEMENT AND A CLOSING BODY

CROSS REFERENCE TO RELATED APPLICATION

This application claims priority to Belgian Patent Application No. 2022/5434, filed Jun. 3, 2022, the disclosure of which is hereby incorporated by reference in its entirety.

BACKGROUND OF THE INVENTION

Field of the Invention

The invention relates to a method for anchoring a hollow tubular element in a water bottom. The invention relates particularly to a method for anchoring a monopile in a water bottom, for instance as foundation for a wind turbine to be placed thereon. The invention further relates to an assembly of a tubular element, such as a monopile, and a closing body, arranged on at least one outer end of the tubular element, whereby the outer end is closed off substantially airtightly by the closing body.

Description of Related Art

The invention will be elucidated with reference to a monopile foundation for an offshore wind turbine. The reference to such a monopile foundation for a wind turbine does not however imply that the invention is limited thereto, and the method can be applied equally well for placing on a water bottom other tubular elements, such as foundations for landing places, piers, jetties, radar towers and other towers, for example.

The foundation of a wind turbine placed at sea must bridge the height difference with the water bottom and absorb the considerable loads acting on a wind turbine. Because dimensions of wind turbines are increasing, foundations are becoming increasingly larger and heavier.

A frequently applied foundation of a wind turbine comprises a monopile which is provided at an upper outer end with a flange on which a wind turbine mast can be mounted. It is also possible to mount on the monopile a transition piece which forms the connection to a turbine mast arranged on the monopile. If use is made of a transition piece, the monopile generally has no flange, but is provided with a tapering outer end. The transition piece can be slid over this outer end, after which the transition piece and the monopile are connected to each other by providing the intermediate space between the tapering outer end of the monopile and the transition piece slid thereover with grout and hardening it. A monopile comprises a hollow and tubular element with two open outer ends, generally made of steel or concrete and with a length which can amount to more than 50 m, a diameter of 6 m and more, and a weight which can be as much as 800 tons and more. The monopile is carried under water and driven with an underside into a water bottom. In use a monopile driven into the water bottom is situated under water, although it can also protrude with a certain length above the water surface.

Anchoring a monopile in the water bottom can be performed according to the prior art by taking up the monopile from a vessel by an upper outer end thereof with a lifting means, for instance a lifting crane, and placing it in a substantially vertical position, and lowering the monopile suspended from the lifting means into the water onto or into the water bottom. The monopile is then driven further into the water bottom by impact with an impact hammer on the upper outer end.

It is possible to perform such a method from jack-up vessels. Such jack-up vessels are provided with legs whereby the vessel can be placed on the seabed, and so takes up a relatively stable position. When travelling, the legs of the jack-up vessel are pulled up so that they do not make contact with the seabed. It is also possible to perform the method from a floating vehicle.

The lifting means may suddenly become overloaded when the monopile is being lowered onto or into the water bottom. This may take place while the monopile is being made to penetrate the water bottom, while the impact hammer is being placed on the upper outer end, and/or during the pile-driving itself.

A sudden re-loading or overloading of the lifting means while the monopile is being made to penetrate the water bottom can for instance occur when the resistance of the water bottom increases during penetration of the monopile and then suddenly decreases in that a weaker layer lies in the water bottom at a certain depth. In the event of a sudden decrease of the resistance, at least a part of the weight of the monopile is fed back to the lifting means, whereby the lifting means is suddenly re-loaded or even overloaded. Such a resistance decrease of the water bottom may for instance occur when a monopile is placed on an erosion protection layer and penetrates this layer under its own weight.

A sudden re-loading of the lifting means can also occur during placing of the impact hammer, for instance when the water bottom has sufficient resistance to bear the weight of the monopile but the resistance is insufficient to bear the weight of the monopile and an impact hammer arranged thereon. If the impact hammer is placed on top of the monopile in such a situation, the monopile may suddenly penetrate further into the water bottom and the weight of the impact hammer is fed back to the lifting means.

A sudden re-loading of the lifting means during the pile-driving may occur when a lower outer end of the monopile reaches a relatively weak water bottom layer (with a relatively low resistance). The monopile will then suddenly shoot off in the direction of the water bottom during the pile-driving. This also entails the risk of the impact hammer coming into contact with parts of the lifting means, for instance with a boom of a crane.

The described sudden re-loading or overloading of the lifting means can be partially absorbed with shock absorbers. When a jack-up vessel is used, the thus reduced shock load is absorbed further by the legs connected to the water bottom. There is here also a risk of overloading of the lifting means and damage to the lifting means.

In the case of a floating vessel a sudden re-loading of the lifting means, this in addition to shock load on the lifting means, can also result in a sudden change in pitch and/or trim of the vessel, whereby the vessel may be forced beyond the permissible pitch angles. This can likewise result in undesired swinging movements of an impact hammer taken up with the lifting means, which may result in collisions between components and to crane limits being exceeded. The use of shock absorbers is not able to solve this problem either, since such an implement is unable to prolong the exposure to shocks in time such that a ballast system could counteract the movements of the vessel.

SUMMARY OF THE INVENTION

In view of the above, there is a need to provide a method for anchoring a hollow tubular element in a water bottom, wherein this element is taken up from a vessel by an upper outer end thereof with a lifting means, and the tubular element suspended from the lifting means is lowered into the water onto or into the water bottom, wherein sudden re-loading or overloading of the lifting means is prevented or the risk thereof is in any event reduced.

According to the invention, this object is achieved by providing a method as described herein. The method is intended to anchor a hollow tubular element with a longitudinal direction and two open outer ends in a water bottom, and comprises the steps of:

a) providing the tubular element, wherein an upper outer end is closed substantially airtightly by a closing body;
b) taking up the tubular element with closing body by the upper outer end from a vessel into a substantially vertical position with a lifting means;
c) lowering the tubular element with closing body suspended from the lifting means into the water, wherein air in the tubular element with closing body is compressed and the pressure in the tubular element with closing body increases;
d) adjusting the weight of the tubular element with closing body suspended from the lifting means by allowing the air to escape at least partially and/or suctioning the air away at least partially to below atmospheric pressure from the tubular element with closing body, whereby the pressure in the tubular element with closing body decreases and the tubular element with closing body penetrates the water bottom under the weight;
e) removing the closing body; and
f) optionally driving the tubular element further into the water bottom.

The method according to the invention controls the weight of the tubular element, provided if desired with an impact hammer or alternative, suspended from the lifting means by controlling the buoyancy of the tubular element, and by providing the option of creating a reduced pressure, for instance a vacuum, in the tubular element in order to increase the penetration of said element under the influence of its own weight.

In order to be able to control the pressure in (the cavity of) the tubular element the closing body must able to close the tubular element substantially airtightly. In this respect it is also important to at least preferably close any passage openings which may be present in a jacket surface of the tubular element. Such passage openings can for instance be necessary for feeding electrical cables and the like through a wall of the tubular element to a structure placed on the tubular element, such as for instance a wind turbine. The passage openings can be closed temporarily, for instance by arranging a pressure-tight sealing plug therein. Other solutions, such as covers and the like, are also possible.

In the context of this application 'substantially' and 'almost' are understood to mean that a stated property is realized at least 90%, or that a stated value varies by 10% at most.

The invention likewise relates to an assembly of a hollow tubular element with a longitudinal direction and two open outer ends, and a closing body arranged on at least one outer end, wherein the assembly, preferably the closing body, further comprises means for allowing air to escape and/or for suctioning air away to below atmospheric pressure from the tubular element with closing body. Said means are needed to be able to control the pressure in (the cavity of) the tubular element.

The means for allowing air to escape preferably comprises a valve, and the means for suctioning air away a vacuum pump. In another embodiment the assembly also comprises means for supplying air to the tubular element with closing body, wherein these means for supplying air preferably comprises a valve and/or a pressure pump. When a valve is used, the air is supplied when the pressure in the tubular element is lower than the atmospheric pressure prevailing in the area surrounding the tubular element. When a pressure pump is used, the air is supplied under pressure, optionally also when the pressure in the tubular element is higher than the atmospheric pressure prevailing in the area surrounding the tubular element.

The present invention solves the above stated prior art problem by making the tubular element as light (upward force by making use of the buoyancy) or as heavy (downward force by making use of the vacuum) as necessary to safely uncouple the lifting means from the tubular element. The weight of the lifting means can thus for instance be transferred to the buoyancy of the tubular element, the lifting means uncoupled from the tubular element, the buoyancy then reduced, whereby the tubular element can penetrate the water bottom under its own weight. The degree to which the buoyancy of the tubular element is set depends inter alia on the resistance of the water bottom layers with which a lower outer end of the tubular element comes into contact.

The own weight of the tubular element with closing body can be increased further by increasing the weight of an applied lifting implement, such as a hoisting hook, from which the closing body is for instance suspended, by increasing the weight of the closing body and by at least partially applying a vacuum to the cavity of the tubular element suspended in the water. The downward forces are then combined in order to have the tubular element actively penetrate the water bottom to a stable depth, wherein the weight of an impact hammer or alternative pile-driving means can also be safely transferred on top of the tubular element. As soon as the impact hammer has been arranged on the upper outer end, the lifting implement of the lifting means, such as a hoist, can be released and the tubular element can optionally be driven even further into the water bottom, for instance by pile-driving with the impact hammer.

A further advantage of the invented method is therefore that the placing of a pile-driving implement, such as an impact hammer, on the tubular element after the closing body was removed therefrom can be done safely in that the tubular element was made as light as necessary by adding air, so that the added weight of the pile-driving implement can result with reduced risk in a tubular element shooting further downward. This is particularly advantageous when arranging a tubular element in a water bottom with bottom layers which have a reduced resistance.

Yet another advantage of the invented method is achieved in the pile-driving itself by ensuring that the combination of the tubular element—from which the closing body was removed—with an impact hammer or other pile-driving means arranged thereon has the right weight to safely overcome bottom layers with reduced resistance. Safely is understood to mean that the tubular element will not suddenly shoot down into the water bottom over a certain distance, wherein the lifting means is certainly re-loaded or even overloaded.

The tubular element can be provided with the closing body in any suitable manner. It is thus possible to arrange the closing body on an outer end of the tubular body onshore and thus transport the tubular element with closing body to the site where the tubular element is to be arranged in a water bottom. It is also possible to transport the tubular elements and closing bodies in non-coupled state and to arrange a closing body on an outer end of the tubular element on the vessel, during transport but preferably on site.

Coupling a closing body to an outer end of the tubular element can take place in known manner, for instance using hydraulic or pneumatic clamping devices, as will be further elucidated below for an embodiment.

The tubular element with closing body can be taken up with the lifting means in any known manner. A lifting implement of the lifting means, for instance a hoisting hook of a lifting crane, can thus be attached to the tubular element and taken up thereby. A practical embodiment of the method has the feature that the tubular element with closing body is taken up with the lifting means in step b) by coupling the closing body to the lifting means, for instance to the hoisting hook of a lifting crane. For this purpose the closing body is provided with a corresponding coupling means, such as for instance a lifting eye.

An embodiment of the method according to the invention is characterized in that allowing the compressed air to escape in step d) is performed at the latest when the tubular element with closing body begins to float. This is not essential according to the invention, but in this preferred embodiment it is prevented that the tubular element begins to float because this makes movements of the tubular element less controllable. The air compressed between the water surface and the closing body is thus held at a pressure which does not exceed the pressure of the compressed air at which the tubular body begins to float. In this embodiment the buoyancy of the tubular body remains limited and a part of the weight of the tubular element is carried by the lifting means.

In another embodiment allowing the compressed air to escape in step d) is performed until a pressure higher than or equal to the atmospheric pressure is reached. At a pressure slightly higher than atmospheric pressure the lifting means can still be relieved, but the monopile can optionally also penetrate further into the water bottom.

A further embodiment relates to a method wherein allowing the compressed air to escape in step d) is performed until the tubular element with closing body has penetrated the water bottom over a length.

The length by which the tubular element with closing body has penetrated the water bottom allows the lifting means to be uncoupled from the tubular element with closing body. In an embodiment of the method the lifting means is indeed uncoupled from the tubular element with closing body after the tubular element with closing body has penetrated the water bottom over said length. The necessary length over which the tubular element with closing body is forced into the water bottom in this embodiment is determined inter alia by the properties of the water bottom and optionally also other ambient properties such as wave heights, wind force and so on. It will be apparent that it should be avoided that the tubular element with closing body sinks down deeper or obliquely after uncoupling of the lifting means.

In order to have the tubular element with closing body penetrate further into the water bottom, in another embodiment of the invention the air is in step d) suctioned away from the tubular element with closing body at least partially to below atmospheric pressure. In other words, in this embodiment an at least partial vacuum is applied to the air situated in the cavity of the tubular element between the water surface and the closing body, which makes the downward forces acting on the tubular element increase. In this embodiment the tubular element can penetrate further into the water bottom until the downward forces acting on the tubular element with closing body are insufficient to overcome the resistance of a water bottom layer. Such a water bottom layer will thus have a relatively high resistance, whereby the tubular element with closing body has reached a stable final length (penetration depth). It is noted that said stable final length does not necessarily correspond with the design penetration depth which can indeed be reached in an embodiment by pressing the tubular element further into the water bottom with a pile-driving implement.

In an embodiment of the method ambient air is let into the tubular element with closing body in step d) when the tubular element with closing body has penetrated the water bottom over the stable final length. A pressure which is substantially equal to the atmospheric pressure is here preferably reached in the cavity of the tubular element with closing body.

In a further embodiment a method is then provided wherein the closing body is removed in step e) by coupling it to the lifting means and taking it up with the lifting means. In this embodiment the tubular element has penetrated the water bottom over a stable penetration depth (or over a stable length of the tubular element) and a substantially atmospheric pressure prevails in the tubular element. This facilitates removal of the closing body.

As already stated, in another embodiment the tubular element can be driven further into the water bottom in step f) by providing the tubular element with a mass, such as a hydraulically or pneumatically driven driving mass or a sonically driven mass, at the upper outer end.

It is further possible to control the tubular element by auxiliary cables operated with winches while it is being taken up with the lifting means and while it is being lowered toward the water bottom. If required, the tubular element can be supported while the tubular element with closing body is being lowered and/or while the tubular element without closing body is being driven further into the water bottom. An embodiment of the invention therefore relates to a method wherein a peripheral part of the tubular element suspended from the lifting means with or without closing body is engaged with outboard gripping members which are connected to the vessel by means of a support structure.

The peripheral part is preferably engaged by the gripping members in at least one of the steps b)-f), preferably in all steps.

If desired, the gripping members can engage a plurality of peripheral parts of the tubular element, for instance two peripheral parts lying at a mutual distance in an axial (longitudinal) direction of the tubular element. For this purpose the gripping members are likewise placed at a mutual distance. The gripping members placed at a mutual distance can co-act and grip the two peripheral parts simultaneously. This is for instance useful when moving the tubular element from a horizontal position to a substantially vertical position (also referred to as upending). The gripping members placed at a mutual distance can also act independently of each other and grip only one of the peripheral parts at a time. This is for instance useful when lowering the tubular element into the water toward the water bottom in a substantially vertical position.

It is further advantageous to provide a method according to an embodiment wherein movements of the gripping members relative to the vessel are damped and/or are compensated. Damping of the movements can be useful during the upending, while compensation of the movements, particularly in a horizontal (x,y)-plane, can be useful while lowering the tubular element toward the water bottom. It is then possible to hold the tubular element in a relatively constant position relative to the water bottom, while the vessel moves under the influence of the effect of waves and wind.

According to the invention, the vessel can comprise a jack-up vessel, pontoon or platform. The vessel is more preferably a floating vessel which cannot be anchored to the seabed as a jack-up platform can.

BRIEF DESCRIPTION OF THE DRAWINGS

The invention will now be elucidated with reference to the following figures, without otherwise being limited thereto. In the figures.

DESCRIPTION OF THE INVENTION

Figure 1:
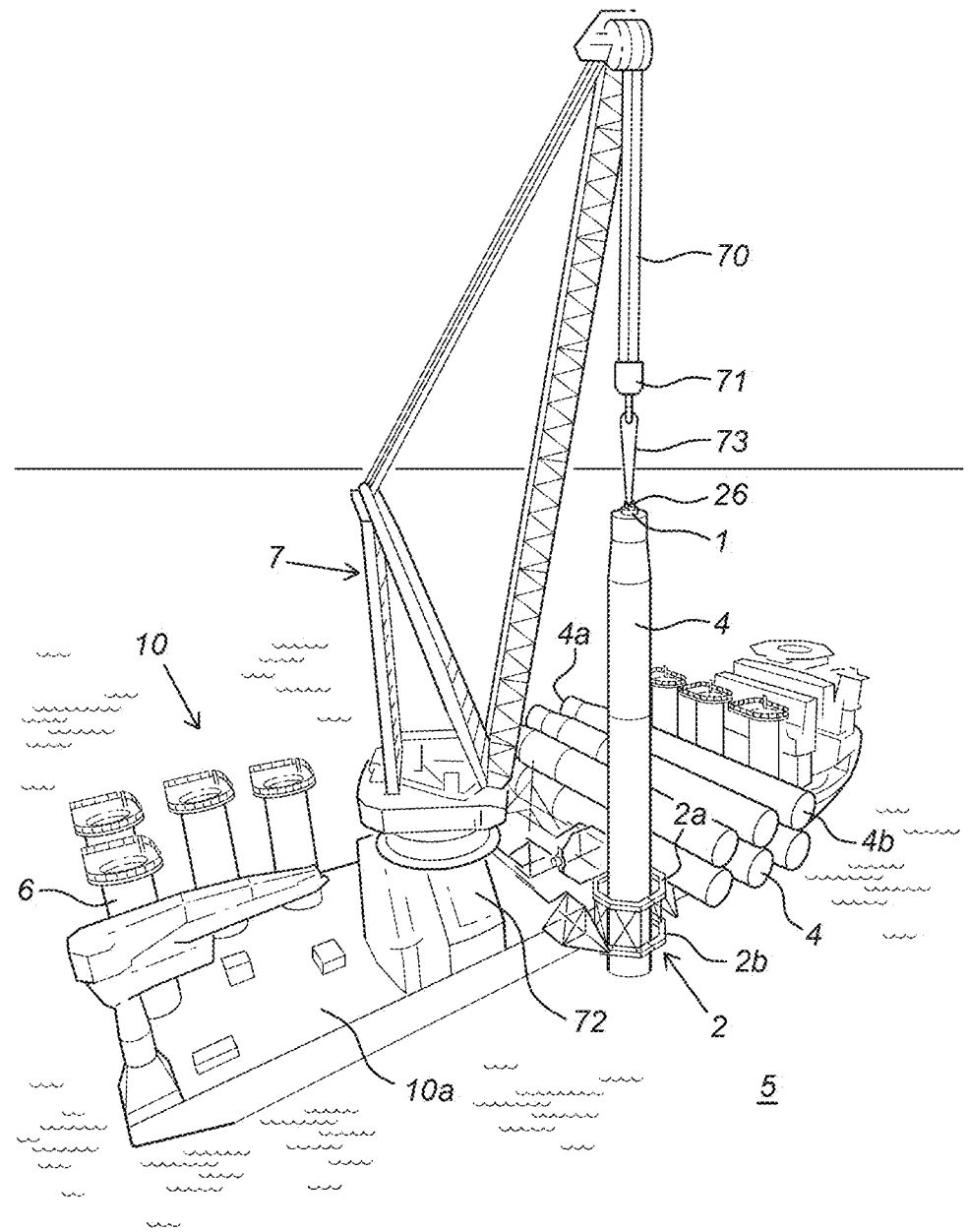
FIG. 1 is a schematic perspective view of a vessel provided with a gripping device whereby the method according to an embodiment of the invention can be performed.

FIG. 1 shows a vessel 10 which can be used for anchoring in a water bottom a hollow tubular element such as a monopile 4 with a longitudinal direction and, in principle, two open outer ends (4a, 4b), particularly for the invented method. According to the invented method, a monopile 4 to be anchored in the water bottom is closed substantially airtightly at an upper outer end 4a of monopile 4 by a closing body 1 which will be further described below. The lower outer end 4b remains open and accessible to ambient air, and also to water when monopile 4 is lowered into the water.

Components, such as for instance a number of transition pieces 6 and monopiles 4 to be arranged in the water bottom, can be placed on a work deck 10a of vessel 10. The work deck of vessel 10 further supports a lifting means in the form of a lifting crane 7, arranged on a base 72 for rotation around a vertical axis. Lifting crane 7 is provided with hoisting cables 70 and, at a free outer end thereof, with a hoisting block 71 with hook, from which a monopile 4 can be suspended from a lifting eye 26 situated at an upper outer end of monopile 4 and more specifically forming part of closing body 1.

The vessel 10 is further equipped with a gripping device 2 which comprises gripping members (2a, 2b) which are positioned at a mutual distance and serve to grip a peripheral part of a monopile 4 suspended from lifting crane 7. The gripping device 2 ensures on the one hand that the monopile 4 can be moved from a horizontal transport position to a vertical position (an operation which is also referred to as upending) in controlled manner, and on the other that a monopile 4 suspended from lifting crane 7 can be lowered onto and into the water bottom in controlled manner During upending, the movements of a peripheral part engaged by a gripping member 2a are preferably damped. During lowering of monopile 4 the movements of a peripheral part engaged by a gripping member 2b are preferably compensated in a horizontal plane so that the position of the engaged peripheral part remains substantially constant relative to the water bottom.

A suitable gripping device 2 is described in the European patent application with publication number EP 3517479, the content of which is expressly included in the present application. Particular reference is made to the description of FIG. 2, in which relevant components of gripping device 2 are described, and to the description of FIG. 6, in which the operation of gripping device 2 is elucidated. It is however also possible to apply a different gripping device.

Vessel 10 can further be equipped with a dynamic positioning and/or mooring system (not shown), which is known as such.

Figure 2:
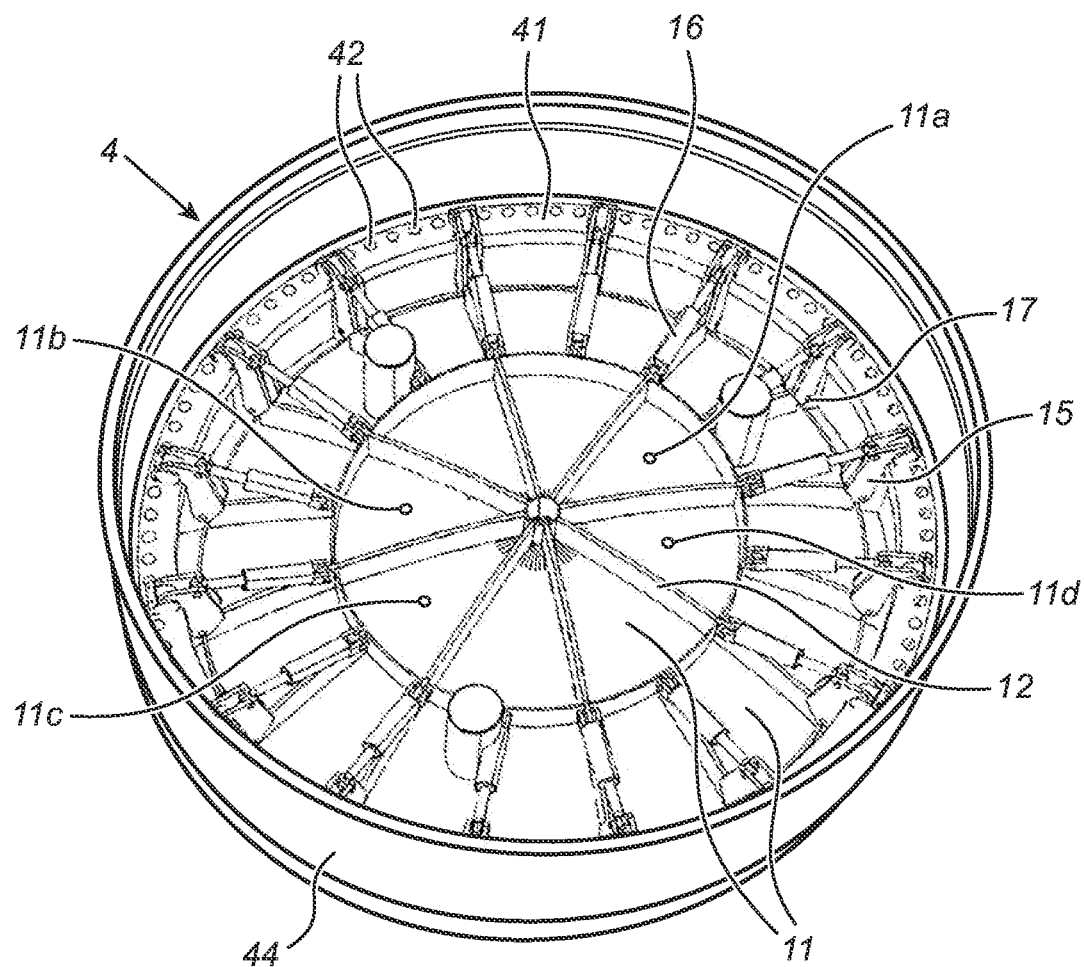
FIG. 2 is a schematic perspective view of a cross-section of a monopile which is closed with a closing body as according to an embodiment of the invention.
Figure 3:
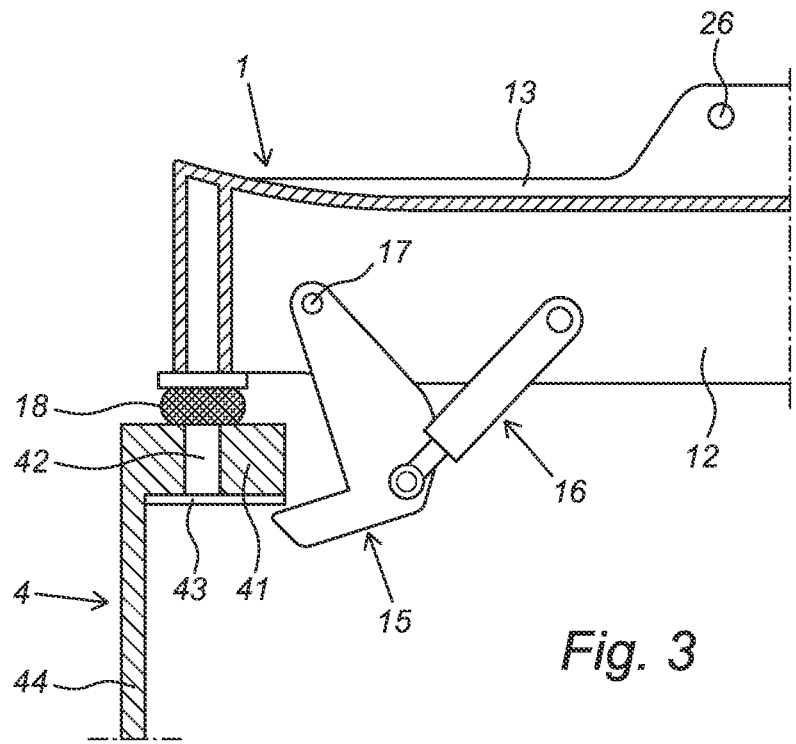
FIG. 3 is a schematic cross-section through a closing body in non-coupled state according to an embodiment of the invention.
Figure 4:
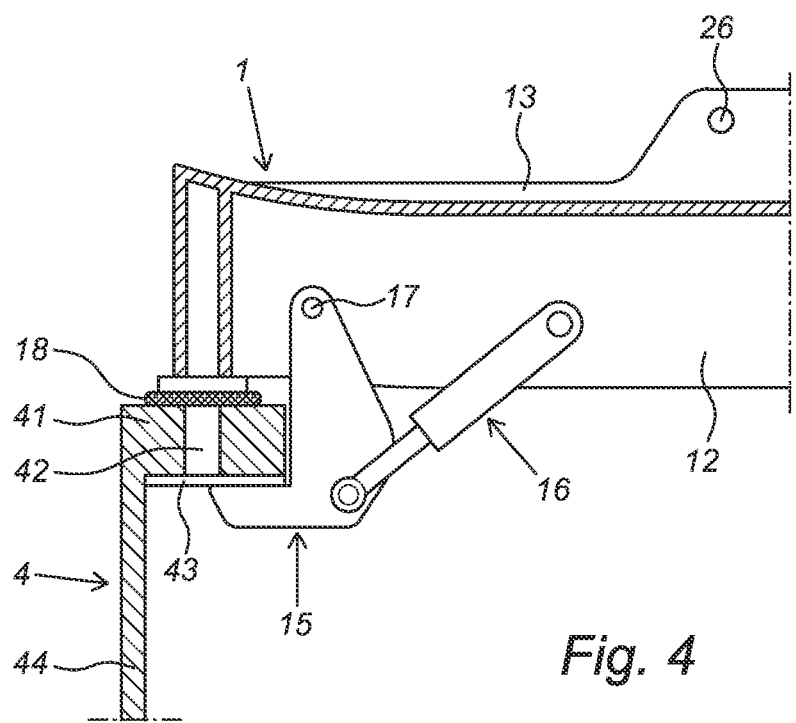
FIG. 4 is a schematic cross-section through a closing body in a state in which it is coupled to a monopile, according to an embodiment of the invention.
Figure 5:
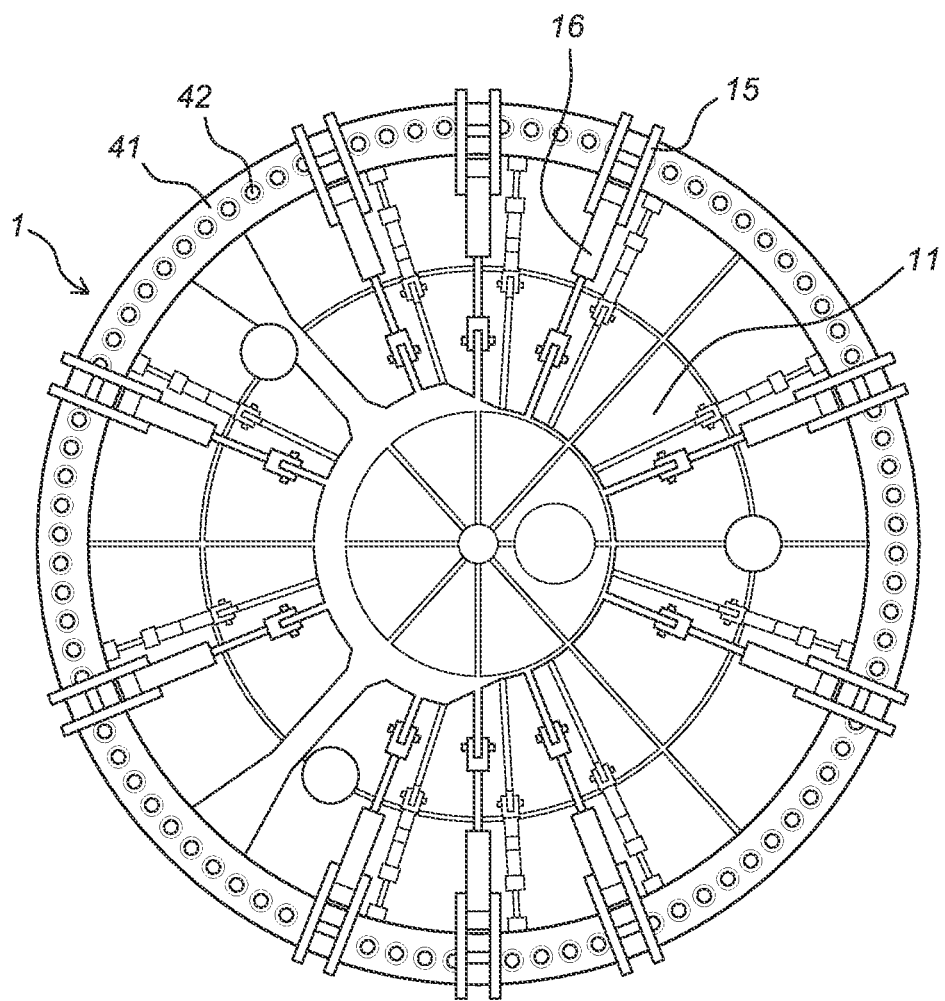
FIG. 5 is a schematic bottom view of a closing body, coupled to a monopile, according to an embodiment of the invention.

According to the invention, an upper outer end 4a of a monopile 4 is closed substantially airtightly by means of a closing body 1 arranged against, on or in the originally open outer end 4a. A suitable closing body is shown in FIGS. 2-4. Other closing bodies can also be applied if desired.

As shown in FIGS. 2-5, the closing body 1 comprises a slightly curved wall 11, a convex side of which is directed when it is coupled to monopile 4 toward an internal cavity 40 of monopile 4. If desired, the wall 11 is provided with strengthening ribs 12. The wall can also be provided with strengthening ribs 13, which cross each other in a centre to which a lifting eye 26 is also attached, on a side remote from cavity 40. The assembly of the closing body 1 with a monopile 4 coupled thereto can be taken up by the lifting eye 26 by lifting crane 7. The diameter of wall 11 is sufficiently great to be able to cover the whole periphery of the upper outer end 4a of monopile 4.

Monopile 4 comprises at the upper outer end 4a an inward directed annular flange 41 which is provided with a series of bolt holes 42 distributed over a periphery. With the annular flange 41 the monopile 4 can be connected to a superstructure arranged thereon, such as a transition element 6 or a wind turbine mast.

Annular flange 41 can also be used to couple closing body 1 substantially airtightly to monopile 4. For this purpose the closing body 1 is provided on the side directed toward cavity 40 with a number of clamping members 15 distributed over the periphery, which members can be moved from the non-coupled positions shown in FIG. 3 to the coupled positions shown in FIG. 4 by placing the hydraulic cylinders 16 under pressure. Clamping members 15 here pivot around hinges 17 mounted on wall 11 until they hook behind the annular flange 41. When hydraulic cylinders 16 are retracted again, the clamping members 15 detach from annular flange 41 and the airtight closure is broken.

In order to have closing body 1 and monopile 4 close airtightly in improved manner the closing body 1 can be provided along a periphery thereof and on the side directed toward the cavity 40 of monopile 4 with an annular closure, for instance a rubber sealing ring 18. If desired, a plurality of rubber sealing rings can be provided, for instance on a side of annular flange 41 facing toward the cavity 40 of monopile 4. It is for instance possible to temporarily seal the bolt holes 42 with plugs arranged on a ring 43, although each bolt hole 42 can also be temporarily closed individually.

Figure 6:
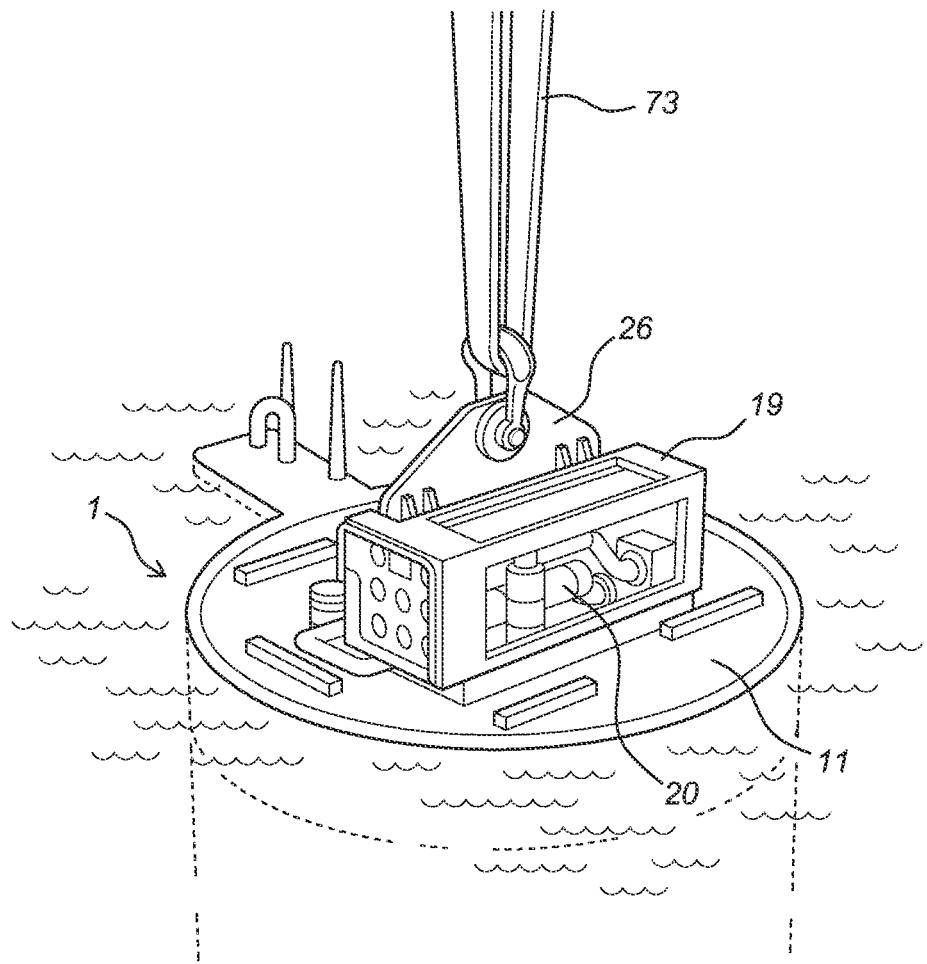
FIG. 6 is a schematic perspective top view of a closing body and monopile, suspended from a lifting crane, according to an embodiment of the invention.

As shown in FIG. 6, in an embodiment the wall 11 of closing body 1 is, in addition to a lifting eye 26, also provided on a side remote from cavity 40 with a frame 19 in which the necessary pumps 20 are received, selected from a vacuum pump and/or a pressure pump. This embodiment has the advantage that the fluid conduits between the pump(s) 20 and the valves (11a, . . . , 11d) can be short. It is noted that the necessary pumps 20 can also be located elsewhere, for instance on the vessel. In that case the necessary fluid conduits must be run from the pumps provided on the vessel to the closing body. According to FIG. 2, the wall 11 is also provided with the necessary valves (11a, . . . , 11d) for allowing air to escape from the cavity 40 of monopile 4, or to enable air to be supplied to said cavity 40. The pumps 20 are connected with conduits (not shown) to the wall 11 and more specifically to the valves (11a, . . . , 11d) of closing body 1.

Referring to FIGS. 7A-7F, a number of steps of the method according to an embodiment are shown. The symbols used in FIGS. 7A-7F have the following meaning:

$F_{cy}$: the force experienced by the lifting crane
p: the pressure in (the cavity 40 of) the monopile 4
$p_{atm}$: the atmospheric pressure
$p_{hs}$: the hydrostatic pressure in the water
V: the air volume in the monopile 4
$d_w$: the water depth
z: a vertical coordinate
B: the buoyancy of the monopile 4
G: the weight of the monopile 4
$l_s$: monopile length situated below the water surface 5
$l_d$: stable monopile length situated in the seabed 25

In the shown embodiment, any cable holes and join holes present in the peripheral wall of monopile 4 are firstly closed prior to installation of the monopile in a seabed. This can be done using plugs suitable for this purpose. It is noted that this step is not always necessary because a certain amount of leakage is permissible.

Closing body 1 provided with lifting eye 26 and with frame 19 can then be mounted on the upper outer end 4a of a monopile 4. Monopile 4 can here for instance be arranged in the gripping device 2 of vessel 10 which is shown in FIG. 1, after which the closing body is taken up by the lifting eye 26 by the lifting crane and is arranged in the upper outer end 4a. An airtight closure can be obtained by placing the above described clamping members 15 with the hydraulic cylinders 16 behind the annular flange 41 of monopile 4 and pressing them down thereon. Closing body 1 can optionally be provided with hydraulic conduits and with air conduits to enable pumps 20 to be controlled and air to be supplied to and discharged from the cavity 40 of monopile 4. The pumps 20 can form part of the closing body 1, but it is also possible to provide the pumps 20, or a part thereof, on the deck 10a of vessel 10.

The monopile 4 closed with the closing body 1 is then moved from a horizontal transport position to a substantially vertical position, if desired using the gripping device 2. Following such upending, the monopile 4 is in a substantially vertical position shown in FIG. 7A. For the sake of clarity the gripper arms (2a, 2b) of gripping device 2 have been omitted in FIGS. 7A-7F, although it will be apparent that in the steps shown in FIGS. 7A-7F the monopile 4 is preferably guided by the gripping device 2, as shown in FIG. 1.

Figure 8:
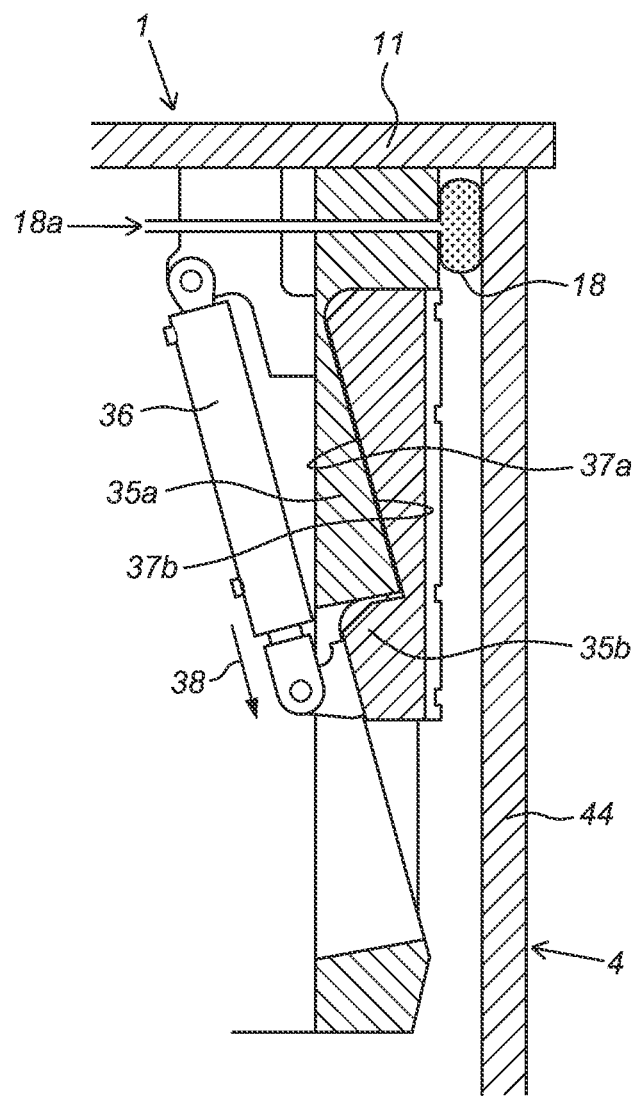
FIG. 8 is a schematic cross-section through a closing body in a state in which it is coupled to a monopile, according to another embodiment of the invention.

The manner of suspension of monopile 4 with closing body 1 is shown in more detail in FIG. 8.

Figure 7B:
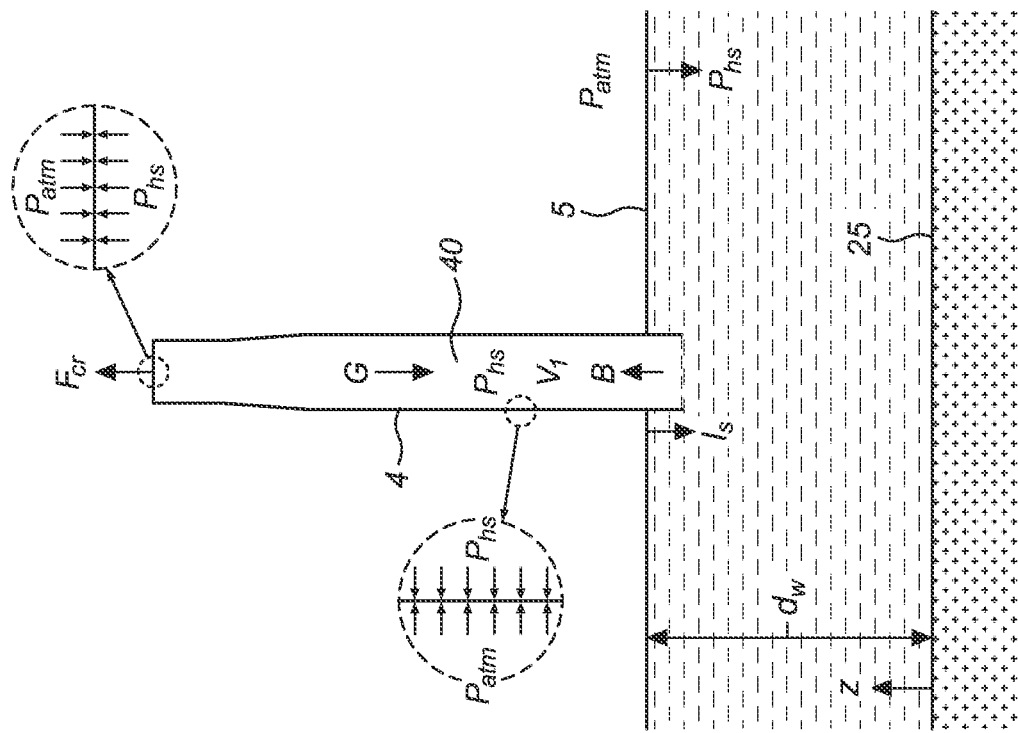
FIG. 7A-7F are schematic representations of method steps according to an embodiment of the invention.
Figure 7A:
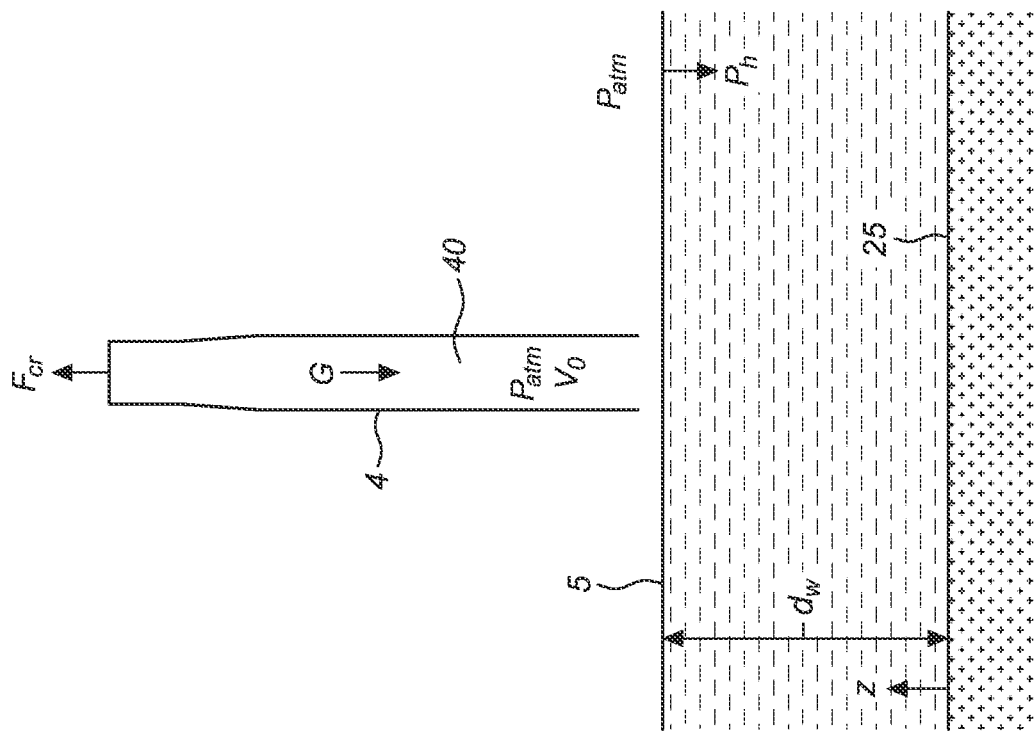

In the situation shown in FIG. 7A the air pressure in (the cavity 40 of) and outside monopile 4 is substantially equal to the atmospheric pressure p atm. Because monopile 4 is suspended both above the seabed 25 and above the water surface 5, the internal air volume is equal to the internal volume $V_0$ of the monopile 4.

Referring to FIG. 7B, the monopile 4 is optionally rotated into a correct angular position around a longitudinal axis using gripping device 2. Any umbilicals which may be present must be able to accommodate this rotation, for which purpose the umbilicals enable a rotation of 180° on each side (so 360° in total), this in order to enable monopile 4 to be rotated in every direction so that vessel 10 can choose its preferred course. This also applies to the air hoses for adding air/creating a vacuum. After optional rotation of monopile 4, it can be lowered toward seabed 25 with interposing of gripping device 2. As soon as a lower outer end 4b of monopile 4 is situated below the water surface 5, the air in the cavity 40 of monopile 4 will be compressed and an overpressure will be built up in monopile 4, wherein the internal pressure $p_{hs}$ is higher than the atmospheric pressure $p_{atm}$. The air volume will also decrease from $V_0$ to $V_1$ and monopile 4 lies below the water surface 5 over a length $l_s$. This creates a certain buoyancy B and reduces the force $F_{cy}$ experienced by the lifting crane.

Figure 7D:
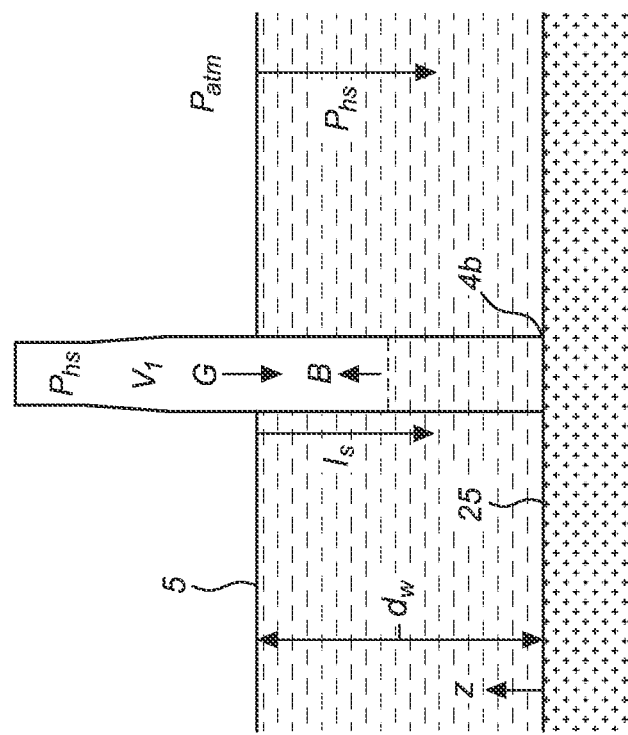
Figure 7C:
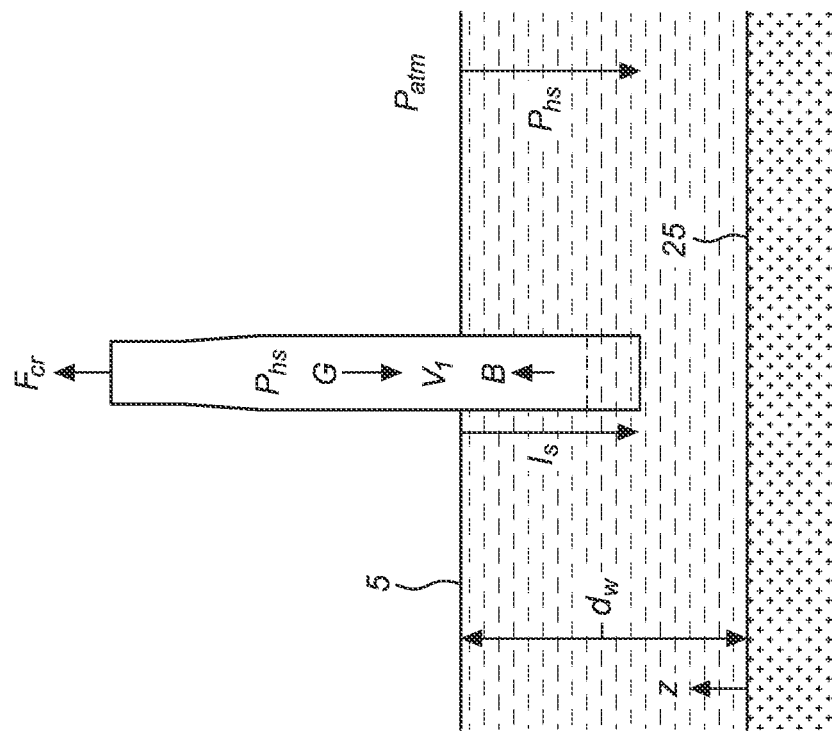

At a determined depth the monopile 4 can begin to float if the buoyancy B exceeds or threatens to exceed the weight G of monopile 4. This situation is shown in FIG. 7C. A floating monopile 4 is difficult to control with lifting crane 7, even with interposing of gripping device 2. This situation should thus preferably be avoided, and this is done by opening a valve (4a, . . . , 4d) or other closable air passage in closing body 1 (or in monopile 4). The air compressed in cavity 40 will escape at least partially and monopile 4 is hereby able to drop further toward seabed 25, until the lower outer end 4b of monopile 4 hits the seabed 25. This situation is shown in FIG. 7D. In the shown situation the monopile 4 is preferably supported for a relatively minor part by the seabed 25 and for the greater part of the weight by the compressed air still situated in the cavity 40 of monopile 4. At this moment lifting crane 7 can be uncoupled from monopile 4 (or in fact from the lifting eye 26 of closing body 1) by uncoupling the hoisting slings 73. At that moment monopile 4 is held in position only by gripping device 2. When monopile 4 has thus penetrated into seabed 25 over a relatively small length $l_b$, the valve (4a, . . . , 4d) or other closable air passage is closed so that no more air can escape from cavity 40.

Figure 7F:
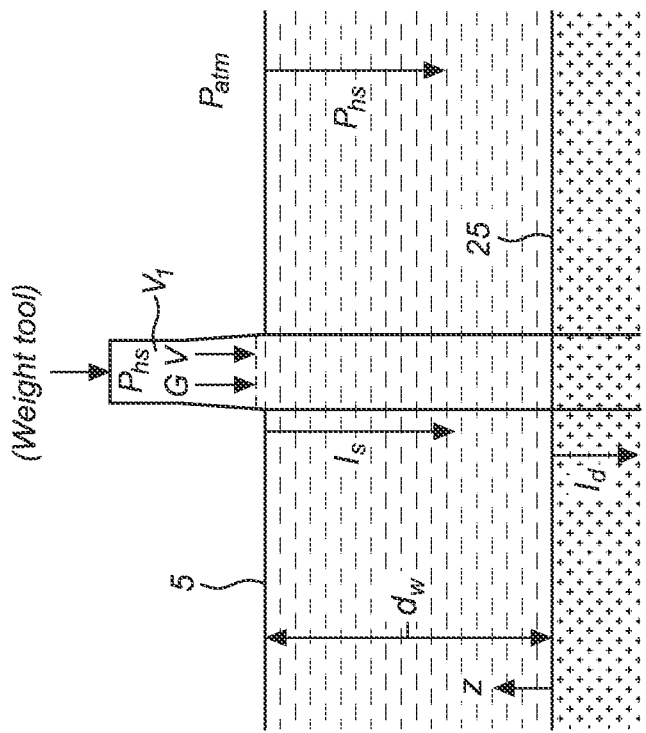
Figure 7E:
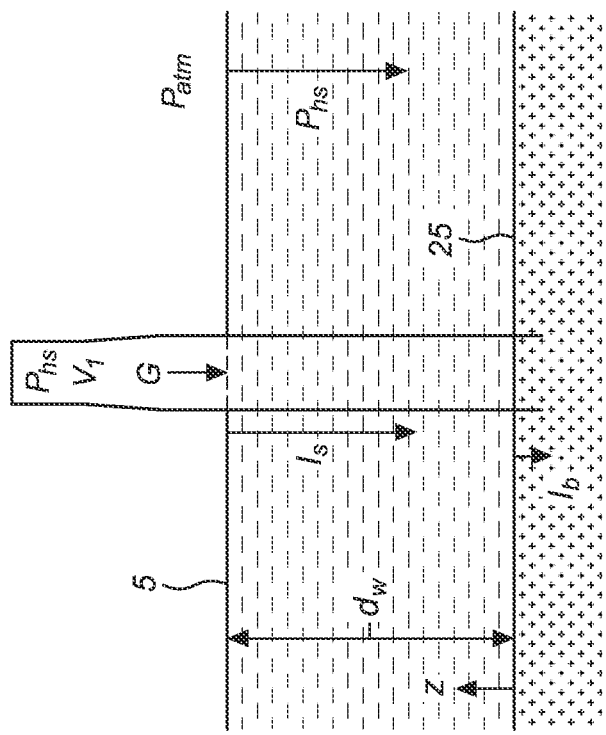

Referring to FIG. 7E, closing body 1 is still situated on the upper outer end 4a of monopile 4, and lifting crane 7 is uncoupled from closing body 1 and monopile 4. This has the object of lowering monopile 4 further into the seabed 25 and moving it through weaker bottom layers to a length $l_b$. This is achieved by allowing the compressed air to escape from the cavity 40 of monopile 4 via the valves (4a, . . . , 4d) or other closable air passage of closing body 1. This method step is continued until the pressure in the cavity 40 of monopile 4 is substantially equal to the atmospheric pressure outside monopile 4.

In order to subsequently have monopile 4 penetrate even further through the relatively weak bottom layers the valves (4a, . . . , 4d) or other closable air passage of closing body 1 are closed and the air is pumped from cavity 40 out of monopile 4. A (partial) vacuum is thus created in an upper part of monopile 4. As a result, the pile will sink further into the ground.

An absolute vacuum may result here in monopile 4, and at a certain moment monopile 4 will reach a state of equilibrium wherein monopile 4 does not sink any further into the water bottom 25. Monopile 4 has here penetrated into the seabed over a stable length $l_d$. This is illustrated in FIG. 7F.

After such a stable situation, wherein the lower outer end 4b of monopile 4 experiences sufficient resistance and the chance of sudden further sinking is relatively small, has been achieved, air is once again let into the cavity 40 of monopile 4 by opening the valves (4a, . . . , 4d) or other closable air passage of closing body 1. Once the air pressure inside and outside monopile 4 is almost equal again (to the atmospheric pressure), lifting crane 7 can be connected to closing body 1 again by coupling the hoisting slings 73 to lifting eye 26. Closing body 1 is then uncoupled from monopile 4 by placing the clamping members 15 in the positions shown in FIG. 4 and brought on deck 10a of vessel 10.

In the situation shown in FIG. 7F monopile 4 is stable on seabed 25, and driving monopile 4 further into seabed 25 can commence. For this purpose a pile-driving implement is arranged on the upper outer end of monopile 4 in known manner.

Finally, FIG. 8 shows a cross-section of a flange-less monopile 4 and a closing body 1 coupled thereto in an alternative manner A monopile 4 according to the shown embodiment can be connected to a transition piece (not shown) by means of grouting. Although FIG. 8 shows a continuously straight monopile 4, an upper outer end of the monopile 4 can optionally taper in order to facilitate placing of the transition piece over the outer end. As shown in FIG. 8, closing body 1 comprises in this embodiment a flat upper wall 11, although it can also be slightly curved. One or more lifting eyes can be mounted on wall 11, as can pumps and the like, as was described above for another embodiment. The diameter of wall 11 is slightly greater than that of monopile 4 so it can cover the whole periphery of the upper outer end 4a of monopile 4.

In order to couple closing body 1 substantially airtightly to monopile 4 the closing body 1 is provided on the side of monopile 4 directed toward cavity 40 with two mutually engaging wedge-shaped clamping bodies (35a, 35b) distributed or running over the periphery. The clamping body 35b can be displaced with the hydraulic or pneumatic cylinder 36 connected thereto relative to clamping body 35a along two obliquely running contact surfaces (37a, 37b). In the case of a movement of cylinder 36 in direction 38 the distance to the peripheral wall 44 of monopile 4 will here decrease until clamping body 35b comes to lie with a side against an inner side of peripheral wall 44 under pressure. This ensures that closing body 1 is clamped in monopile 4. In the non-clamped situation shown in FIG. 8 the cylinder 36 is retracted and clamping body 35b lies clear of the wall 44.

In order to have closing body 1 and monopile 4 close airtightly in improved manner the closing body 1 can be provided along a periphery thereof and on the side directed toward the cavity 40 of monopile 4 with an annular closure, for instance an inflatable rubber sealing ring 18. This sealing ring 18 can be placed under pressure with compressed air 18a. If desired, a plurality of (inflatable) rubber sealing rings can be provided. The ability to inflate the sealing ring 18 with compressed air can also be applied in the embodiment shown in FIGS. 2-5.

The invention claimed is:

1. A method for anchoring a hollow tubular element with a longitudinal direction and two open outer ends in a water bottom, wherein the method comprises the steps of a) providing the tubular element, wherein an upper outer end is provided with a removable closing body for substantially closing the upper outer end in an airtight manner;
b) taking up the tubular element with closing body by the upper outer end from a vessel into a substantially vertical position with a lifting means;
c) lowering the tubular element with closing body suspended from the lifting means into the water, wherein air in the tubular element with closing body is compressed and a pressure in the tubular element with closing body increases;
d) adjusting a weight of the tubular element with closing body suspended from the lifting means by controlling the pressure in the tubular element by allowing the air to escape at least partially in a controlled manner and/or suctioning the air away at least partially in a controlled manner to below atmospheric pressure from the tubular element with closing body, whereby the pressure in the tubular element with closing body decreases and the tubular element with closing body penetrates the water bottom under the weight, wherein allowing the compressed air to escape is performed at the latest when the tubular element with closing body begins to float until the tubular element with closing body has penetrated the water bottom over a length;
e) removing the closing body; and
f) optionally driving the tubular element further into the water bottom.

2. The method according to claim 1, wherein allowing the compressed air to escape in step d) is performed until a pressure higher than or equal to the atmospheric pressure is reached.

3. The method according to claim 1, comprising of at least partially suctioning away the air from the tubular element with closing body in step d) to below atmospheric pressure, whereby the tubular element with closing body penetrates further into the water bottom.

4. The method according to claim 3, wherein in step d) ambient air is let into the tubular element with closing body when the tubular element with closing body has penetrated the water bottom over a stable final length.

5. The method according to claim 1, wherein in step b) the tubular element with closing body is taken up with the lifting means by coupling the closing body to the lifting means.

6. The method according to claim 1, wherein the closing body is removed in step e) by coupling it to the lifting means and taking it up with the lifting means.

7. The method according to claim 1, wherein the lifting means is uncoupled from the tubular element with closing body after the tubular element with closing body has penetrated the water bottom over said length.

8. The method according to claim 1, wherein in step f) the tubular element is driven further into the water bottom by providing the tubular element with a hydraulically or pneumatically driven driving mass or a sonically driven mass, at the upper outer end.

9. The method according to claim 1, wherein a peripheral part of the tubular element with closing body suspended from the lifting means is engaged with outboard gripping members which are connected to the vessel by means of a support structure.

10. The method according to claim 9, wherein the peripheral part is engaged by the gripping members in at least one of the steps b)-f).

11. The method according to claim 9, wherein movements of the gripping members relative to the vessel are damped and/or are compensated.

12. The method according to claim 1, wherein the vessel is a floating vessel.

13. An assembly of a hollow tubular element with a longitudinal direction and two open outer ends, and a closing body arranged on at least one outer end, wherein the assembly further comprises means for controlling the pressure in the tubular element by allowing air to escape and/or for suctioning air away to below atmospheric pressure from the tubular element with closing body, wherein the means for allowing air to escape and/or for suctioning air away is configured to allow the air to escape at the latest when the assembly begins to float until the tubular element with closing body has penetrated the water bottom over a length.

14. The assembly according to claim 13, wherein the means for allowing air to escape comprise a valve.

15. The assembly according to claim 13, wherein the means for suctioning away air comprise a vacuum pump.

16. The assembly according to claim 13, further comprising means for supplying air to the tubular element with closing body.

17. The assembly according to claim 16, wherein the means for supplying air comprise a valve and/or a pressure pump.

* * * * *